B. H. SMITH & P. MacGAHAN.
ELECTRICAL PROTECTIVE DEVICE.
APPLICATION FILED NOV. 28, 1913.
1,204,507.
Patented Nov. 14, 1916.
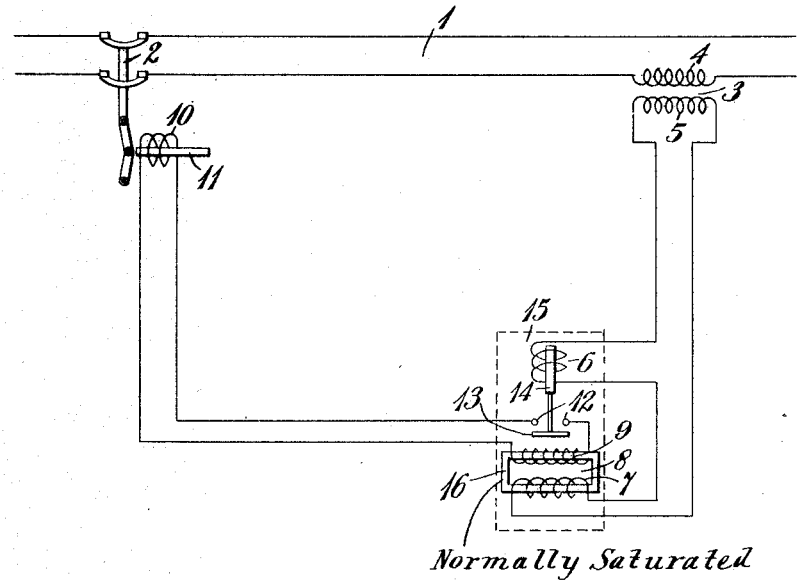
Normally Saturated

UNITED STATES PATENT OFFICE.

BENJAMIN H. SMITH, OF TURTLE CREEK, AND PAUL MacGAHAN, OF PITTSBURGH, PENNSYLVANIA, ASSIGNORS TO WESTINGHOUSE ELECTRIC AND MANUFACTURING COMPANY, A CORPORATION OF PENNSYLVANIA.

ELECTRICAL PROTECTIVE DEVICE.

1,204,507.   Specification of Letters Patent.   Patented Nov. 14, 1916.

Application filed November 28, 1913. Serial No. 803,408.

*To all whom it may concern:*

Be it known that we, BENJAMIN H. SMITH, a citizen of the United States, and a resident of Turtle Creek, in the county of Allegheny and State of Pennsylvania, and PAUL MacGAHAN, a citizen of the United States, and a resident of Pittsburgh, in the county of Allegheny and State of Pennsylvania, have invented a new and useful Improvement in Electrical Protective Devices, of which the following is a specification.

Our invention relates to electrical protective devices and particularly to relays.

The object of our invention is to provide a relay device that shall be adapted to trip a circuit interrupter or operate other similar devices when the current that traverses the circuit rises to a predetermined value.

Heretofore, considerable difficulties have been experienced in the use of relays of the series trip type by reason of the fusing of the contact members when currents of abnormally large values traverse the same.

To overcome the above mentioned difficulties, we provide, in our invention, a device comprising a relay and a transformer having a saturated magnetic circuit for preventing an abnormal rise in the value of the current that traverses its contact members.

The single figure of the accompanying drawing is a diagrammatic view of circuits and devices embodying our invention.

Referring to the drawing, an electrical circuit 1 is interrupted by a circuit interrupter 2 when the current that traverses it exceeds a predetermined value. A series transformer 3 has its primary winding 4 connected in series relation to one conductor of the circuit 1 and its secondary winding 5 connected in circuit with a magnet winding 6 and the primary winding 7 of a saturated transformer 8. The secondary winding 9 of the transformer 8 is connected in series relation to the winding 10 of a tripping electromagnet 11, and it is controlled by contact terminals 12 and a movable bridging member 13 that is attached to the movable core member 14 of an electromagnet 15 upon which the winding 6 is disposed.

When a current of an abnormal value traverses the circuit 1, a current of a corresponding value will traverse the secondary winding 5 of the transformer 3, and this current will energize the winding 6 of the electromagnet 15 sufficiently to move the movable core member 14 and the bridging member 13 upwardly to complete the circuit comprising the secondary winding 9 of the saturated transformer 8 and the winding 10 of the tripping electromagnet 11. Since the primary winding 7 of the transformer 8 is in circuit with the secondary winding 5 of the transformer 3, the current traversing the same induces a current of such value in the secondary winding 9 as to cause the tripping electromagnet 11 to open the circuit 1 by tripping the circuit interrupter 2.

Since the transformer 8 has a magnetizable core member 16 that becomes saturated when a current of a normal value traverses the circuit 1, a current of an excessive value traversing the primary winding 7 will not increase the value of the current traversing the winding 9 in proportion by reason of the magnetic saturation of the magnetic core member 16, as is familiar to those versed in the art. The current that traverses the secondary winding 9 increases but the increase is not sufficient to fuse the contact terminals 12 when current of a relatively large value traverses the circuit 1. Hence, the difficulties usually experienced in series trip relays are obviated.

While we have described a relay for opening a circuit interrupter which is supplied with energy from a transformer having a saturated magnetic circuit, we desire it to be understood that our invention may be equally as well applied to the operation of other devices by the employment of modifications which do not depart from the spirit and scope of our invention as set forth in the appended claims.

We claim as our invention:

1. An electrical protective device comprising an electromagnet winding, a transformer having a normally saturated core and a primary winding connected in circuit with said electromagnet winding, a secondary circuit comprising a secondary winding of the said transformer and an auxiliary actuating device and means actuated by said electromagnet winding to close said secondary circuit.

2. In a relay, the combination with an electromagnet, of a transformer having a normally saturated core and primary and secondary windings, the said primary winding and the winding of the said electromagnet being series-connected, and means operated by said electromagnet to close the circuit of the secondary winding of the said transformer.

3. In an electric circuit, the combination with a circuit interrupter, a tripping magnet, and a relay for controlling the circuit of the tripping magnet, of a magnetically saturated transformer one winding of which is connected to the circuit through the winding of the relay and the other winding of which is connected in circuit with the tripping magnet.

4. In an electrical circuit, the combination with a circuit interrupter, a tripping magnet, and a relay for controlling the circuit of the tripping magnet, of a normally saturated transformer electrically connected to the circuit, the tripping magnet and the winding of the relay for supplying the tripping magnet with a predetermined value of current irrespective of the current traversing the circuit above a predetermined value.

5. An electrical protective device comprising an electromagnet, a transformer having a normally saturated core, a primary winding connected to the winding of said electromagnet and a secondary winding, and means operated by the said electromagnet to control the flow of current through said secondary winding.

6. An electrical protective device comprising an electromagnet, a transformer having primary and secondary windings and a normally saturated core for preventing the current in the secondary winding from rising in proportion to the current in the primary winding, said primary winding being connected in circuit with the electromagnet, and means operated by the said electromagnet to control the flow of current through the said secondary winding.

7. In an electrical protective device, the combination with an electrical circuit, of a circuit interrupter having a tripping means comprising an electromagnet, a relay, a transformer having a normally saturated core, means for supplying the winding of the said relay and the primary winding of said transformer with current that is proportional to the current traversing the said electrical circuit, means actuated by said relay to control the flow of current in the secondary winding of the said transformer which is electrically connected to the winding of the said tripping electromagnet.

8. In an electric circuit, the combination with a circuit interrupter and a tripping magnet, of a relay for controlling the circuit of the tripping magnet, and inductive means connected in circuit with the winding of the relay for controlling the current that traverses the said tripping magnet.

9. In an electric circuit, the combination with an electro-responsive device, and means for controlling its circuit in accordance with the current that traverses the circuit, of a normally saturated transformer one winding of which is connected to the circuit through the said controlling means and the other winding of which is connected to the electro-responsive device for causing it to be supplied with current disproportionately to the current that traverses the circuit.

10. In an electrical circuit, the combination with a circuit interrupter, a tripping magnet, and a relay for controlling the circuit of the tripping magnet, of a normally saturated transformer electrically connected to the circuit, the relay and the tripping magnet for supplying the tripping magnet with a predetermined value of current when the current traversing the circuit is above a predetermined value.

11. In an electric circuit, the combination with a circuit interrupter, a tripping magnet, and a relay for controlling the circuit of the tripping magnet, of means operatively connected to the circuit for supplying the tripping magnet with a substantially constant current from the circuit, irrespective of the current that traverses the circuit.

12. In an electrical circuit, the combination with an electro-responsive device and a relay for controlling the circuit of the electro-responsive device, of means operatively connected to the circuit for supplying the electro-responsive device with a substantially constant predetermined current from the circuit, irrespective of the current that traverses the circuit.

13. In an electric circuit, the combination with an electro-responsive device and means for closing the circuit of the electro-responsive device under predetermined conditions in the circuit, of means operatively connected to the circuit for supplying the electro-responsive device with a substantially predetermined constant current from the circuit, irrespective of the current that traverses the circuit above a predetermined value.

14. In an electric circuit, the combination with an electro-responsive device and means for closing the circuit of the electro-responsive device under predetermined conditions, of means connected between the circuit and the electro-responsive device for causing it to be supplied with current from the circuit disproportionately to the current that traverses the circuit.

In testimony whereof, we have hereunto subscribed our names this 18th day of Nov., 1913.

BENJAMIN H. SMITH.
PAUL MacGAHAN.

Witnesses:
B. B. HINES,
M. C. MERZ.